United States Patent [19]
Patton

[11] 3,964,262
[45] June 22, 1976

[54] HYDROSTATIC TRANSMISSION CONTROL SYSTEM

[75] Inventor: Jon R. Patton, Jackson, Mich.

[73] Assignee: Clark Equipment Company, Buchanan, Mich.

[22] Filed: June 10, 1975

[21] Appl. No.: 583,921

[52] U.S. Cl. .................................. 60/447; 60/494
[51] Int. Cl.² ........................................ F16H 39/46
[58] Field of Search ............ 60/445, 447, 456, 464, 60/494

[56] References Cited
UNITED STATES PATENTS

| | | |
|---|---|---|
| 3,054,263 | 9/1962 | Budzich et al. .................. 60/447 |
| 3,143,127 | 8/1964 | Frost ............................... 137/116.3 |
| R28,113 | 8/1974 | Howard et al. .................. 60/447 |

Primary Examiner—Edgar W. Geoghegan
Attorney, Agent, or Firm—Ernst H. Ruf

[57] ABSTRACT

An improvement in a control system, including a brake device, for a vehicle having a hydrostatic transmission which includes a hydrostatic pump and a hydrostatic motor. The hydraulic control circuit includes a control pump, a high pressure conduit, a low pressure conduit, differential pressure regulator valve means and a directional control valve means interposed in the high and low pressure conduits and a fixed orifice means interposed in the low pressure conduit upstream from the differential pressure regulator valve. The improvement takes the form of an adjustable orifice means interposed in a branch conduit, between the high and low pressure control conduits downstream from the fixed orifice means, with the adjustable orifice means permitting the adjustment of the pressure differential between the high and low pressure control conduits.

5 Claims, 3 Drawing Figures

HYDROSTATIC TRANSMISSION CONTROL SYSTEM

BACKGROUND OF THE INVENTION

1. Field of the Invention

The field of art to which this improvement pertains includes fluid operated control systems, more particularly, a control system for a vehicle having a hydrostatic transmission.

2. Description of Prior Art

Briefly, this invention constitutes an improvement in a known hydrostatic transmission control system wherein a main propulsion system, driven by a prime mover, is connected to one or more fluid traction motors which in turn drive the vehicle wheels. A fixed displacement charge pump, driven at prime mover speed, is used as a source of both fluid under high pressure and fluid under a lower pressure, with these fluid pressures in turn being utilized for the actuation of a spring-centered double-acting hydraulic motor or cylinder whose piston rod is connected to one end of the main propulsion pump swash plate. The movement of the piston rod, in one direction or the other, causes a corresponding movement of the swash plate to thereby change the displacement of the main propulsion pump. Thus, at any given time, a differential pressure is produced by the engine driven charge pump, with the magnitude of this differential pressure varying directly with the magnitude of the engine speed. The resulting pressure produces a reaction in the hydraulic cylinder that controls the swash plate which, in turn, causes a propulsion action on the vehicle drive wheels. This known prior art control system also includes a directional control valve and a differential pressure regulator valve which can influence the displacement of the propulsion pump swash plate. The high and low fluid pressures that indirectly act on the swash plate can be overridden by the differential pressure regulator valve via a control input which originates in a brake master cylinder upon the depression of the brake pedal by the vehicle operator.

Various hydrostatic transmissions and control systems therefor have been disclosed previously as exemplified by U.S. Pat. No. 3,054,263, to Budzich et al, issued Sept. 18, 1962 and U.S. Pat. No. Re. 28,113, to Howard et al, issued Aug. 13, 1974.

While the prior art hydrostatic transmission control systems will function satisfactorily in most instances, it should be recognized that manufacturing tolerances do exist and that they can and do influence vehicle performance. For example, the lower of the differential pressures used in the control system is achieved via a fixed orifice, which orifice is generally located within the charge pump which in turn is usually procured from an independent manufacturer and therefore there is only limited control over the accuracy of this fixed orifice. Furthermore, due to unavoidable manufacturing variations, there will be individual variances in the swash plate tilting moments of the main propulsion pump. In addition, there will be manufacturing tolerance variations not only in the directional control and regulator valves but also in the swash plate actuating cylinder and all of these variances or variations can and do affect vehicle performance.

SUMMARY OF THE INVENTION

In order to overcome these variances, the improved hydrostatic control system of this invention utilizes a means for adjusting the differential pressure between the high pressure and low pressure conduits connected to the swash plate control cylinder. This means for adjusting the differential pressure between the low and high pressure conduits preferably takes the form of a variable fluid flow restrictor, such as an adjustable orifice, with this orifice being interposed in a conduit that is connected to both the low and high pressure conduits.

The adjustable orifice is preferably located intermediate the differential pressure regulator and directional control valves and is adjusted at the final assembly of the vehicle in order to compensate for variations in characteristics of the propulsion pump response to the differential fluid pressure acting on the spring-centered swash plate control cylinder. This adjustment is preferably made at final assembly of the vehicle by running the engine and adjusting the adjustable orifice such that the stall pressure in the main hydrostatic conduits is equal to a previously determined value.

The adjustment of variable fluid flow restrictor overcomes the previously mentioned manufacturing tolerances and individual variations and promotes not only the operational stability of the hydrostatic transmission control system but also permits optimal performance of the vehicle.

Other features and advantages of this improved hydrostatic transmission control system will be more readily understood by persons skilled in the art when following the detailed description in conjunction with the several drawings.

DESCRIPTION OF THE PREFERRED EMBODIMENT

Figure 1:
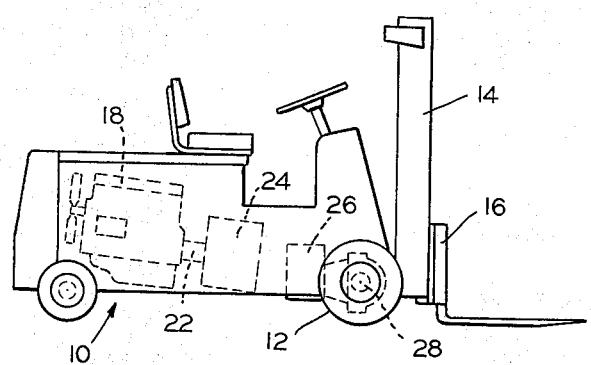
FIG. 1 is a simplified elevational view of an industrial vehicle, such as a lift truck, having a hydrostatic transmission that incorporates the present invention.
Figure 2:
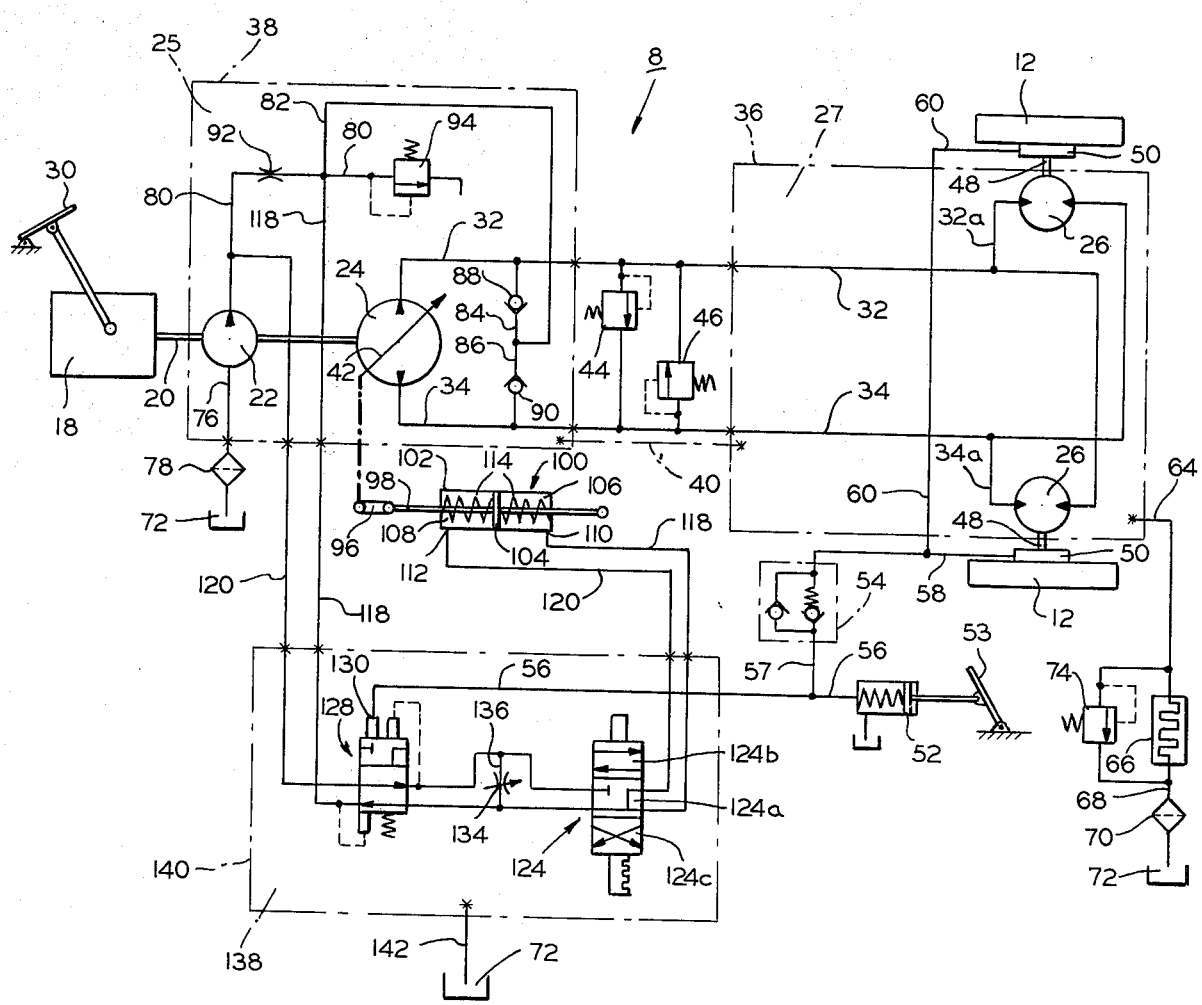
FIG. 2 is a diagrammatic view of a hydrostatic transmission system for a traction vehicle of the type shown in FIG. 1, including the hydraulic circuitry and components embodied in the present invention.

Referring now to the drawings in detail, the improved transmission control system 8 of FIG. 2 of the present invention is shown in FIG. 1 as being mounted in an industrial vehicle 10, such as a lift truck having drive wheels 12, the conventional upright 14 and a load mechanism 16. The lift truck or traction vehicle 10 includes an internal combustion engine 18 which drives, through a drive shaft 20 (FIG. 2), a conventional fixed displacement charge or control pump 22 and a conventional variable displacement axial piston propulsion pump 24. Engine 10 may also drive one or more auxiliary fixed or variable displacement pumps (not shown) for supplying fluid under pressure to hydraulic accessories (not shown). Pump 24 is connected via fluid lines (not shown in FIG. 1) to one or more conventional fixed displacement fluid traction motors 26. If but one fluid motor is utilized, drive wheels 12 are driven through an axle assembly 28 as shown in FIG. 1. In the alternative, each wheel 12 can be driven separately by a fluid motor 26 as shown in FIG. 2.

As best seen in FIG. 2, engine 18 is controlled by an operator via accelerator pedal 30 and propulsion pump 24 is connected to fluid motors 26 by means of conduits 32, 32a and 34, 34a which serve as the main hydraulic or hydrostatic circuit to supply the pressurized fluid, generated by pump 24, to motors 26, with motors 26 having a casing 27 that is diagrammatically bounded by phantom line 36.

Pumps 22 and 24 are also located within one or more pump casings 25 which are diagrammatically bounded by phantom line 38, with the connection between casings 36 and 38 being indicated by line 40.

Propulsion or main power pump 24 is of the variable displacement type and preferably of the well-known piston type wherein multiple pumping pistons are engaged by a common thrust plate or adjusting member that gives the pistons their reciprocative pumping action. The thrust or swash plate 42 of such a pump has a variable angle which affects simultaneous variation of the strokes of all of the pump pistons from minimum to maximum with a predetermined displacement range. Swash plate 42, when actuated, serves to vary the displacement of pump 24 and is designed to inherently return to its zero displacement position with a force which increases as swash plate 42 is actuated away from its zero displacement position. A further inherent characteristic of pump 24 is that as the load imposed on pump 24 by motors 26 increases, the force which tends to return swash plate 42 to its zero displacement position also increases.

As previously noted, propulsion pump 24 is in an enclosed hydraulic circuit with motors 26 via conduits 32, 32a and 34, 34a, with conduits 32 and 34 being cross connected via external cross port pressure relief valves 44 and 46 that serve to limit the maximum pressure in conduits 32 and 34 respectively.

As best seen in FIG. 2, each drive wheel 12 is driven by traction motor 26 via drive line 48. Mounted on each drive line 48 is a brake 50 of any suitable type, each of which serves to hold wheel 12 from rotation relative to drive line 48. Brakes 50 form a part of a brake system which includes a master cylinder 52, actuated by pedal 53, and a brake control valve 54. Master cylinder 52 is connected to brake control valve 54 by means of fluid conduits 56, 57, with brake control valve 54 in turn being connected to brakes 50 by means of conduits 58 and 60. Thus, actuation of master cylinder 52 generates pressurized fluid which is directed to brakes 50, causing them to be applied.

Motor casing 36 is connected, via fluid conduit 64 to a heat exchanger 66 which in turn is connected, via fluid conduit 68 and filter 70 to reservoir 72. A pressure relief valve 74 is also connected to conduits 64 and 68 in order to permit fluid flow in case heat exchanger 66 becomes clogged.

The inlet of charge pump 22 is connected to reservoir 72 via fluid conduit 76 and filter 78. Fixed displacement charge pump 22 supplies fluid through conduits or lines 80, 82, 84 and 86 to the primary closed loop circuit 32, 34 to insure that the loop always has sufficient hydraulic fluid. The fluid is delivered by the charge pump to the low pressure side of the closed primary loop through check valves 88, 90 in lines 84 and 86, respectively. Fluid conduit 80 also includes a fixed fluid flow restriction or orifice 92, with conduit 80 further being connected to casing 25 via charge pressure relief valve 94.

One end of propulsion pump swash plate 42 is connected via a mechanical linkage 96, of any desired construction, to one end of piston rod 98 of a spring-centered double-acting hydraulic motor or cylinder 100.

Double-acting fluid motor 100, which functions as an adjusting device for swash plate 42, includes a housing 102 which is adapted to be mounted on pump casing 38 and extend partially into it. Slidably disposed in cylinder 100 is a piston 104 to which piston rod 98 is connected and which extends through both ends of cylinder 100. Piston 104, together with housing 102, defines a pair of chambers 106 and 108 having ports 110 and 112, respectively. Each of chambers 106, 108 contains one or more substantially similar springs 114, with the inner ends of springs 114 abutting the side surfaces of piston 104 thereby causing piston 104 to return to substantially centered or zero position at no load. It should be understood that the movement of piston 104 in one direction or the other causes a corresponding movement of swash plate 42 to thereby change the displacement of propulsion pump 24. The introduction of pressure fluid into one of chambers 106 or 108 causes the displacement of piston 104 and at least a partial compression of spring 114 in the other of chambers 106 or 108. The equalization of pressures in chambers 106 and 108, of course, permits springs 114 to again return piston 104 to its centered or zero position.

Also connected to charge pump 22, specifically to conduit 80 and downstream from orifice 92, is one end of a fluid conduit 118, the other end of which is connected to port 110 in cylinder 100. In addition, a further conduit 120 has one end connected to conduit 80, upstream from orifice 92, and the other end connected to port 112 of cylinder 100. As will be described in more detail later, conduits 118 and 120 basically serve as the low and high pressure conduits for the control system circuit of this invention.

It should be understood at this time that fluid pressure upstream from orifice 92 is transmitted to the left hand end or chamber 108 of cylinder 100 through lines 80 and 120 while pressure downstream from orifice 92 is transmitted to the opposite end or chamber 106 in cylinder 100 via lines 80 and 118. Because of the foregoing, the differential pressure acting against piston 104 will be the same as and vary with the differential pressure across orifice 92. Thus, at any given time, a differential pressure is produced by engine driven charge pump 22, with the magnitude of this pressure varying directly with the magnitude of the engine speed. The resulting pressure produces a reaction in cylinder 100 which in turn causes a propulsion action on vehicle drive wheels 12. The total affect is that the propulsion of the vehicle varies with engine speed and the action produced in this system is swash plate motion in proportion to engine rpm. A resulting advantage of this system is that engine 18 can never stall since the pressure would be relieved in cylinder 100 as the engine speed is decreased.

The transmission control system also includes a directional control valve 124, which may, for example, be a conventional three-position manually operated four-way valve, which has a neutral position 124a as shown, a forward position 124b, and a reverse position 124c in which latter position the direction of flow of pressurized fluid to cylinder 100 is reversed. Thus, the direction of travel of piston 104 in cylinder 100 is controlled by valve 124. The position of this valve determines which of cylinder ports 110 or 112 receives the higher pressure. In the neutral position, 124a, cylinder ports 110 and 112 are interconnected, thereby, producing equal pressures and no cylinder reaction, i.e., piston 104 is biased to its neutral or center position via springs 114.

The transmission control system further includes a differential pressure regulator or inching control which can influence the displacement of propulsion pump swash plate 42. This control includes a differential pressure regulator valve 128 upstream from directional control valve 124, with valve 128 overriding the control pressures in conduits 118 and 120 via a control input which originates in brake master cylinder 52 and is channeled to port 130 in regulator valve 128 via conduit 56. A more complete functional and structural description of regulator or inching valve 128 will be made with reference to FIG. 3 hereinafter and a complete description is contained in co-pending U.S. Patent Application Ser. No. 567,680 filed on April 14, 1975, with this application also being assigned to the assignee of this invention.

Figure 3:
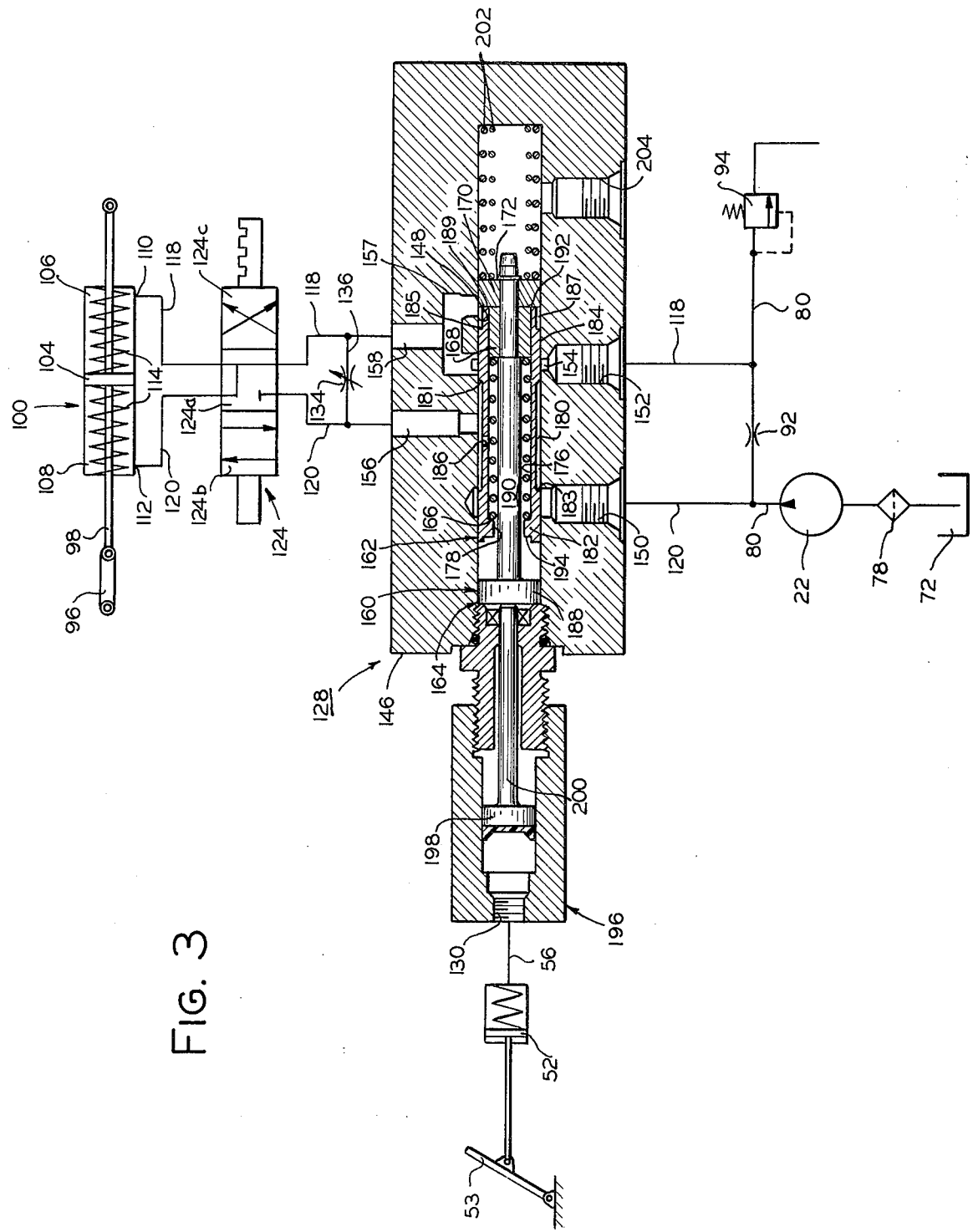
FIG. 3 is an enlarged fragmentary structural and partly diagrammatic view of a portion of the structure shown in FIG. 2.

Reference is now made to FIG. 3 for a more detailed showing of the invention. Regulator valve 128 includes an elongated body 146 having a longitudinally extending bore 148 therein. Communicating with bore 148 is a high pressure inlet port 150 which is connected with conduit 120 so that high pressure fluid from pump 22 is communicated to bore 148. Also communicating with bore 148 is a low pressure inlet port 152 which is connected with low pressure conduit 118 so that lower pressure fluid from pump 22 is communicated to bore 148. Low pressure inlet port 152 includes an annular groove 154, the importance of which will become clear as the description of this valve progresses. Also communicating with bore 148 is a high pressure outlet port 156 that is connected with a further portion of conduit 120. In addition, also communicating with bore 148 is a low pressure outlet port 158 that is connected with a downstream portion of conduit 118.

Slidably disposed in bore 148 of valve body 146 is a spool 160 which controls the fluid flow between inlet port 150 and outlet port 156, and inlet port 152 and outlet port 158, as well as inlet port 152 and outlet ports 158 and 156. Spool 160 is actually an assembly of parts including an outer spool member 162, an inner spool member 164, a regulating spring 166, spring retainer sleeve 168 and combined annular stop and seal member 170, with the entire assembly being held together by a retainer ring 172 affixed to a portion of inner spool 164.

Outer spool member 162 has a longitudinally extending bore 176, with an inwardly projecting portion 178 near one end. Bore 176 contains regulating spring 166 and portion 178 provides a shoulder against which regulating spring 166 abuts. Outer spool member 162 also includes an annular groove 180 in the outer periphery thereof, with annular groove 180 defining annular land 182 on one end thereof and annular land 184 near the other end thereof. Annular lands 182 and 184, having regulating edges 183 and 181 respectively, serve to control the communication of inlet ports 150 and 152 with outlet port 156. Annular groove 180 is connected to bore 176 by means of a connecting passage 186 so that fluid pressure in bore 176 is communicated to annular end surface 194 on outer spool member 162 adjacent land 182. Annular land 184 also has an annular step portion 185 and a reduced diameter portion 187, with the latter merging into an outer annular end surface 189.

Inner spool member 164 is mushroom-shaped and includes a flange portion 188 and a rod portion 190, with the latter having an annular stepped portion 192. Inner spool member rod portion 190 extends through portion 178 of outer spool member 162 and provides clearance therebetween so as to permit pressure fluid to flow from bore 176 to annular end surface 194 of outer spool member 162 adjacent to annular land 182.

Regulating spring 166 is disposed around rod portion 190 in bore 176 and is held in abutment with portion 178 by spring retainer sleeve 168 which likewise is disposed on rod portion 190 and abuts annular rod portion 192 on one end and the inner end of seal 170 on the other end, thus completing the assembly of spool 160.

Valve body 146 is also provided with a conduit 157, one end of which merges into low pressure outlet port 158 and the other end of which merges into bore 148 at a location so that low pressure fluid, from bore 154, is always acting at least against annular step portion 185 and also capable of acting on annular outer end surface 189 depending on the position of outer spool member 162.

At this point it will be noted that outer spool member 162 is biased into abutment with flange portion 188 of inner spool 164 by regulating spring 166, unless sufficient fluid pressure from outlet port 156 is communicated to annular end surface 192 so as to overcome the bias of regulating spring 166 and that of the low pressure fluid acting on step portion 185 and end surface 189.

Threadably connected to valve body 146 is a cylinder member 196 which is disposed coaxially with bore 148 and a portion of which extends a short distance thereinto. Slidably disposed in cylinder 196 is piston 198. Integral with piston 198 is piston rod 200 which extends through one end of cylinder 100 into bore 148 to engage flange portion 188 of inner spool member 164. The outer end of cylinder 196 is provided with port 130 for connection with conduit 56 of the brake system for directing fluid into the cylinder.

One or more return springs 202 are disposed in bore 148 between combined seal and stop member 170 and the adjacent end of the bore, with return springs 202 tending to bias inner spool member 164 into abutment with the portion of cylinder 196 which is threaded into cylinder body 146 and thus serves as a stop and limits the movement in one direction, of inner spool member 164.

It should be noted that combined seal and stop member 170 is sealingly received within bore 148 and that the face of member 170 adjacent to springs 202 is exposed only to attmospheric pressure whereas the inner annular end face of member 170 is exposed to the pressure supplied by low pressure conduit 118. In the event of the leakage of pressurized fluid past member 170, valve housing 146 is also provided with a vent port 204.

At this point, it should be clear that inner spool member 164 is actuatable between a first extreme position when flange portion 188 is held in abutment with cylinder 196 by return springs 202, and a second extreme position determined by the point at which piston 198 bottoms on an inner portion of cylinder 196. In addition, it should also be understood that at these two extreme positions, annular end surface 194 of spool outer member 162 substantially abuts flange portion 188 of inner spool member 164, with the compression loading of regulating spring 166 thus being substantially the same in these two extreme positions. However, in positions intermediate these two extreme positions, outer spool member 162 is axially displaced away from inner spool member flange portion 188, thereby increasing the compression loading of regulating spring 166.

In operation, when a lift truck, for example, is standing with its engine idling, the regulating valve is in an inactive position (not shown) whereby the fluid communication between inlet ports 150, 152 and outlet ports 156, 158 respectively, is unrestricted. In this condition of regulating valve 128, there is a minimum of high pressure fluid pressure acting on annular surface end 194 while low pressure fluid is acting on annular end surface 189. Since there is no fluid pressure acting on piston 198, return springs 202 hold inner spool member 164 in abutment with cylinder 196. In this position, high pressure fluid enters bore 148 via port 150 and outer spool member annular groove 180 and leaves therefrom via outlet port 156. At the same time, a portion of this high pressure fluid also enters outer spool member bore 176 via connecting passage 186 but is unable to overcome the forces of regulating spring 166 and the low pressure fluid acting on annular end surface 189 at this time, so that outer spool member annular end surface 194 substantially abuts inner spool member flange portion 188. As previously noted, at the same time, low pressure fluid enters a portion of bore 148 via inlet port 152, annular groove 154, and bore 157. This low pressure fluid, however, is kept sealingly separate from the previously-noted high pressure fluid via annular land portion 184 and spring retainer sleeve 168 with a portion of the latter being in sealable slidable relationship with bore 176. In addition, seal and stop member 170 keeps the low pressure fluid from entering that portion of bore 148 occupied by return springs 202. The low pressure fluid exits from valve body 146 via exit port 158.

Now, assuming that the lift truck is traveling forwardly in a normal manner (FIG. 3), with increased engine speed, this increase in engine speed also proportionately increases the high pressure fluid pressure so that the high pressure fluid in bore 176 acts on outer spool member annular end surface 194, thereby compressing regulating spring 166 and displacing outer spool member 162 and the low pressure fluid acting on annular end surface 189 until member 162 abuts and rests against combined seal and stop member 170. Since there is still no fluid pressure acting on piston 198, return springs 202 are still holding inner spool member 164 in abutment with cylinder 196. At this time, low pressure fluid continues to enter annular groove 154 from inlet port 152 and exits from groove 154 into low pressure outlet port 158. Thus, at this point in operation, as shown in FIG. 3, the fluid communication between inlet ports 150, 152 and outlet ports 156, 158, respectively, is still unrestricted. As previously noted, high pressure outlet port 156 is connected to one of ports 110, 112 in cylinder 100 whereas low pressure outlet port 158 is connected to the other of ports 112, 110, depending of course on the position of directional control valve 124.

In regard to the "inching" operation itself, for present purposes, it is sufficient to point out that in FIG. 3, in response to the operation of brake pedal 53, inching valve 128 regulates a pressure differential in balanced and equal area portions or chambers 106, 108 of cylinder 100. Thus, regulator valve 128 controls high pressure against low pressure independent of vent pressure (atmospheric) and independent of the absolute magnitude of the low pressure in conduit 118. In addition, the low pressure fluid in conduit 118 is connected to the low pressure side of cylinder 100 at all times and never changes in value as a result of an input to the vehicle brake system, whereas the high pressure fluid is regulated depending on the input to the vehicle brake system. It should of course be understood that the low pressure in conduit 118 can change depending upon conditions in the external portions of the circuits, such as in filter 70, cooler 66 and cases 36, 38, etc. (FIG. 2). The throttling or shutting off of the high pressure fluid to the high pressure side causes a return of piston 104, in cylinder 100, toward its center position thereby in turn causing swash plate 42 to start to return to its center or neutral position. Upon the full depression of brake pedal 53, both chambers of cylinder 100 are connected via ports 158, 156 respectively to low pressure inlet port 152 via groove 154 and groove 180, respectively, thus assuring the centering of piston 104.

While the hydrostatic transmission control system described up to this point will function satisfactorily in most instances, it should be recognized that manufacturing tolerances do exist and that they can influence vehicle performance. For example, fixed orifice 92 is generally located within charge pump 22 which is usually procured from an independent pump manufacturer. Therefore, there is only limited control over the accuracy of fixed orifice 92. In addition, due to unavoidable manufacturing variations, there will be individual variances in the swash plate tilting moments of propulsion pump 24. Furthermore, there will be manufacturing variances and tolerance variations not only in directional control valve 124 and regulator valve 128, but also in swash plate actuating cylinder 100. All of these variances can affect vehicle performance. For example, with engine 18 running at maximum governed speed, and with drive wheels 12 stalled or prevented from turning, the pressure in high pressure hydrostatic conduits 32 and 34 can vary over a wide range.

In order to overcome these variances, interposed between directional control valve 124 and regulator valve 128 is a variable fluid flow restrictor 134, preferably in the form of an adjustable orifice, with orifice 134 in turn being interposed in a conduit 136, one end of which is connected to conduit 118 while the other end is connected with conduit 120.

The addition of adjustable orifice 134 to the transmission control circuit changes the resistance to flow from pump 22 to pressure relief valve 94 by providing an additional (parallel to orifice 92) fluid path, which in turn provides a means for adjusting the differential pressure between lines 120 and 118. As best followed by viewing FIG. 3, this additional fluid path extends from inlet port 150 via annular groove 180, outlet port 156 and conduit 120 to conduit 136, and therefrom through adjustable orifice 134 and conduit 118 back to inching valve port 158, groove 154, port 152 and via conduits 118 and 80 to valve 94.

The location of adjustable orifice 134 between differential pressure regulator 128 and directional control valve 124 has a beneficial effect on the functioning of valve 128. The reason for this beneficial effect is that metering of the fluid is required only at regulating edge 183 of spool land 182 and inlet port 150. Normally, spool 162 would alternately be required to meter fluid between regulating edge 183 and the edge of port 150 as well as regulating edge 181 of spool land 184 and the edge of outlet port 158, which could result in a degree of instability.

As shown in FIG. 2, directional control valve 124, regulator valve 128 and variable fluid flow restrictor 134 are preferably located in a control cover 138 (not shown per se) bounded by phantom line 140, with control cover 138 also being connected to reservoir 72 by line 142.

The adjustment feature, provided by adjustable orifice 134, has been found to be most desirable in order to compensate for the previously-noted variations in the characteristics of the propulsion pump response to differential pressure acting on control cylinder 100. This adjustment is preferably made at final assembly of the vehicle by running the engine and adjusting orifice 134 such that the stall pressure in main hydrostatic conduits 32 and 34 is equal to a previously determined value. This adjustment overcomes the aforementioned manufacturing tolerances and individual variances so as to promote not only the operational stability of improved hydrostatic transmission control system 8, but also permits optimal performance of vehicle 10.

From the foregoing, it is believed that those familiar with the art will readily recognize and appreciate all the concepts and features of the present invention. Obviously, while the invention has been described in relation to only one preferred embodiment, numerous variations, changes and substitutions of equivalents will present themselves to persons skilled in the art and may be made without necessarily departing from the scope and principles of this invention. As a result, the embodiment described herein is subject to various modifications, changes and the like, with the scope of this invention being determined solely by reference to the claims appended hereto.

What is claimed is:

1. In a control system, including a brake device, for a vehicle having a hydrostatic transmission of the type which includes a main hydraulic circuit comprising a variable displacement propulsion pump having a pivotable adjusting member and including a spring-centered adjusting device, and hydraulic motor means, said control system also including a hydraulic control circuit comprising a driving engine, a control pump drivingly connected to said engine so as to rotate at a speed proportional to the speed of said engine, said control pump being in fluid communication with said main hydraulic circuit and said hydraulic control circuit, said hydraulic control circuit including fluid reservoir means in fluid communication therewith, a first or high pressure control conduit, a second or low pressure control conduit, said first and second control conduits being substantially parallel to each other and communicating with said spring-centered adjusting device, directional control valve means interposed in said first and second control conduits, differential pressure regulator valve means interposed in said first and second control conduits upstream from said directional control valve means, said differential pressure regulator valve means being continuously biased to an open position, with said differential pressure regulator valve being operatively connected to said brake device so as to be progressively movable to a closed position in proportion to the degree of actuation of said braking device, and fixed orifice means interposed in said second control conduit upstream from said differential pressure regulator valve, wherein the improvement comprises:
   a. a branch conduit, downstream from said fixed orifice means, for connecting said first and second control conduits; and
   b. adjustable orifice means interposed in said branch conduit for adjusting the differential pressure between said first and second control conduits.

2. The improved control system of claim 1 wherein said branch conduit is located intermediate said differential pressure regulator and said directional control valves.

3. The improved control system of claim 1 wherein said branch conduit is located downstream from said differential pressure regulator valve.

4. The improved control system of claim 1 wherein said adjustable orifice means is adjusted at the final assembly of said vehicle in order to compensate for variations in characteristics of said propulsion pump response to the differential fluid pressure acting on said adjusting device.

5. The improved control system of claim 1 wherein said adjustable orifice means is adjusted at the final assembly of said vehicle such that the stall pressure in the main hydraulic circuit is equal to a previously determined value.

* * * * *